Jan. 12, 1926.

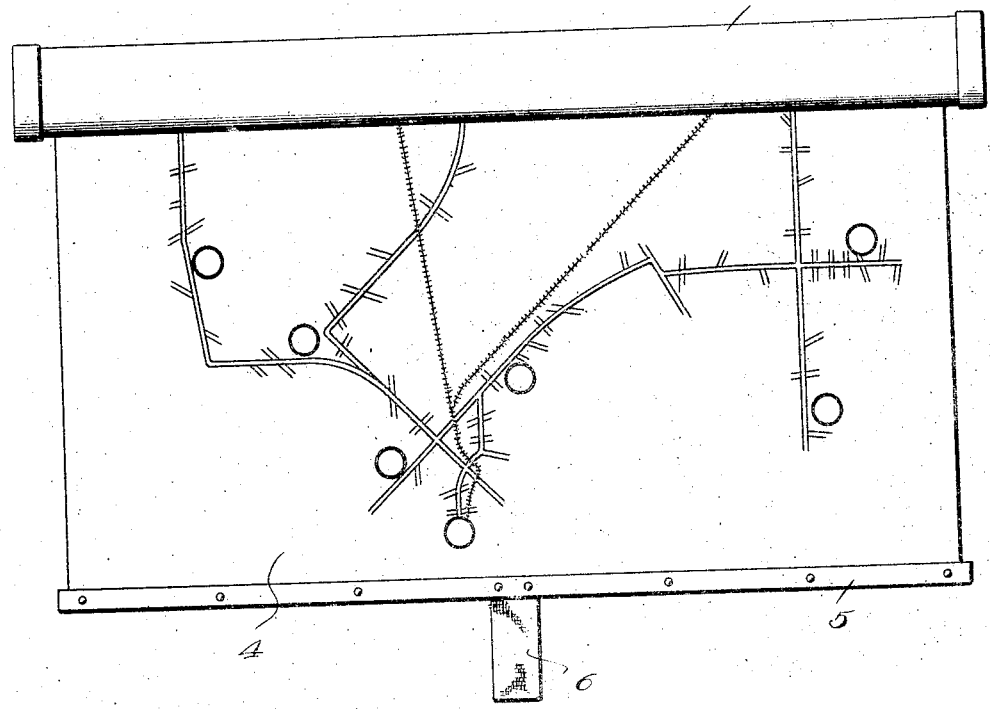
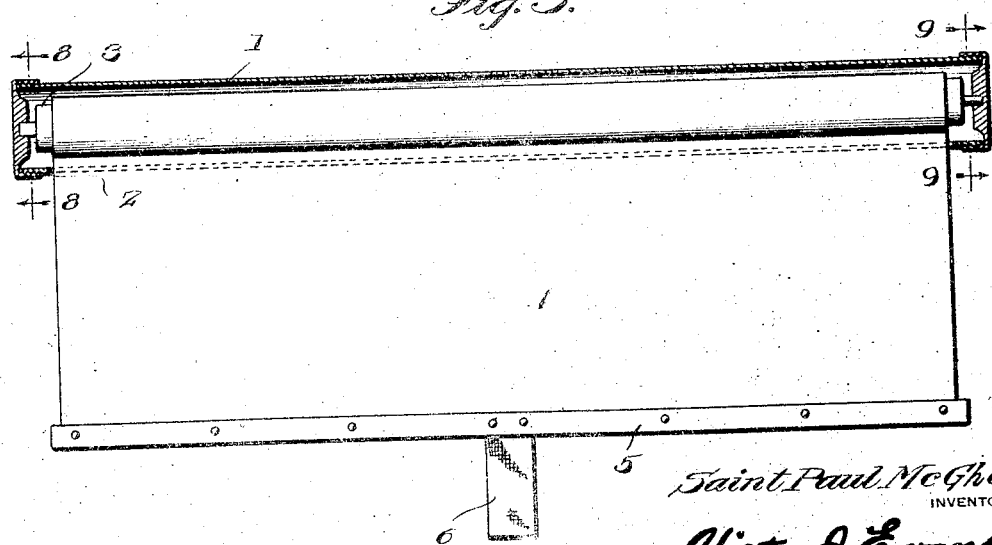

S. P. McGHEE 1,569,822

ROAD MAP AND CASE

Filed Dec. 10, 1923     2 Sheets-Sheet 2

Saint Paul McGhee
INVENTOR

BY Victor J. Evans
ATTORNEY

WITNESS:

Patented Jan. 12, 1926.

1,569,822

UNITED STATES PATENT OFFICE.

SAINT PAUL McGHEE, OF LAURINBURG, NORTH CAROLINA.

ROAD MAP AND CASE.

Application filed December 10, 1923. Serial No. 679,805.

*To all whom it may concern:*

Be it known that I, SAINT PAUL MCGHEE, a citizen of the United States, residing at Laurinburg, in the county of Scotland and State of North Carolina, have invented new and useful Improvements in Road Maps and Cases, of which the following is a specification.

This invention relates to route indicating means for motor vehicles and the like, the general object of the invention being to provide a road map wound upon a roller and a casing containing the roller with means for attaching the casing to a part of the vehicle adjacent the driver's seat.

Another object of the invention is to provide means for connecting the casing to the windshield or another part of the vehicle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of the device with the map partly withdrawn from the same.

Figure 3 is a longitudinal sectional view.

Figure 8:
Figure 9:
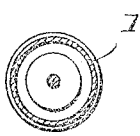

Figures 8 and 9 are cross sectional views on lines 8—8 and 9—9 respectively of Figure 3.

Figure 2:
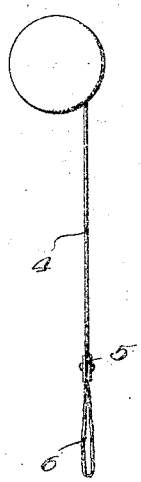
Figure 2 is an end view of the casing.
Figure 4:
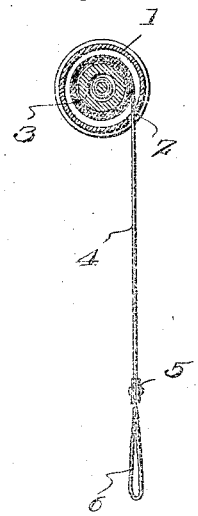
Figure 4 is a transverse sectional view.
Figure 5:
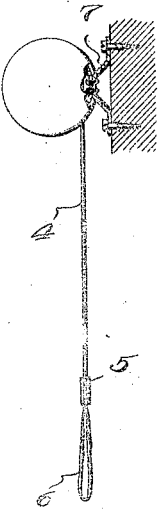
Figure 5 is a view showing the device in use upon an automobile.
Figure 6:
Figures 6 and 7 are views showing how the device is attached to a windshield.
Figure 7:
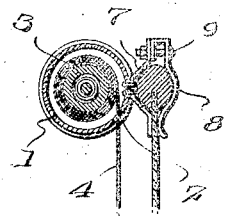

In these views, 1 indicates a casing which is of cylindrical shape and which has a longitudinally extending slot 2 in its lower part. A spring roller 3 is rotatably mounted in the casing and a map 4 is fastened to this roller and projects through the slot. A strip 5 of metal or the like is secured to the outer end of the map and a tab 6 is connected with the strip for facilitating the withdrawal of the map from the case. Brackets 7 are connected with the case, adjacent the ends thereof, so that the device can be fastened by screws or the like to the dash or other part of an automobile, as shown in Figure 5, but when the device is to be fastened to the windshield of an automobile I provide a spring clamping jaw 8 which is attached by a bolt 9 with each of the brackets 7 so that the brackets and jaws will clamp the casing to a part of the windshield frame, as shown in Figures 6 and 7.

From the above it will be seen that the road map can be easily and quickly pulled from the casing when it is to be studied and after information desired has been gained the map is released and the spring will draw it back into the casing where it will be protected from elements and from dirt and dust. This invention will provide a ready means of holding a road map where it is easily accessible and doing away with the folded maps now in use.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a cylindrical casing having a slot therein, a spring roller mounted in the casing, a map strip carried by the roller and extending through the slot, a supporting bracket at each end of the casing, said bracket having a curved central part and straight end parts, perforated to receive fastening means and a spring jaw for each bracket having a bolt receiving part at its upper end so that it can be bolted to the upper part of the bracket. For permitting the casing to be attached to a windshield frame of a vehicle the brackets permitting the casing to be attached to a part of a closed vehicle when the spring jaws are removed from the brackets.

In testimony whereof I affix my signature.

SAINT PAUL McGHEE.